D. L. ANTHONY.
MEANS FOR INJECTING SEALING LIQUID INTO TIRES.
APPLICATION FILED SEPT. 26, 1918.
1,322,507.
Patented Nov. 25, 1919.
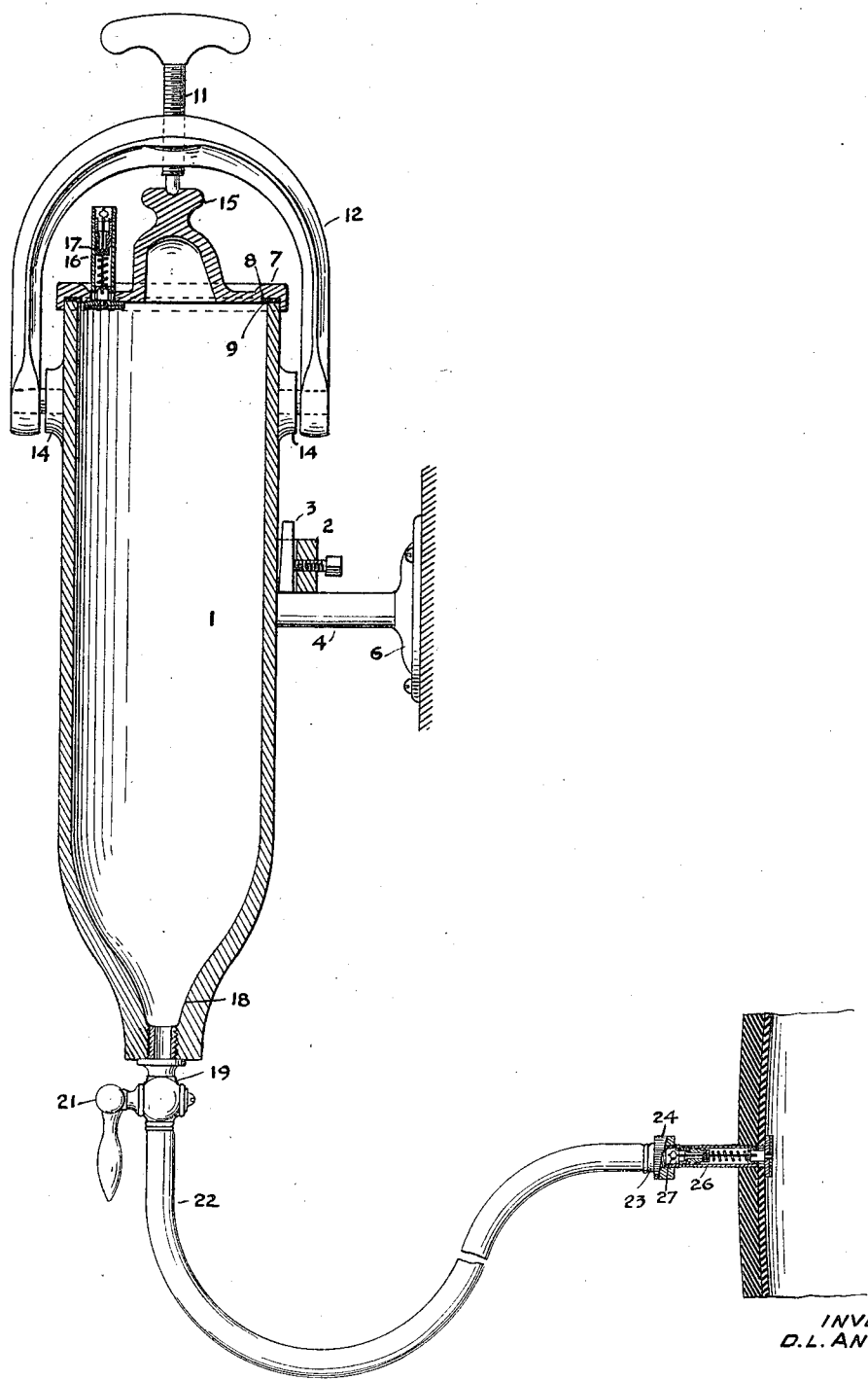
INVENTOR
D. L. ANTHONY
ATT'Y.

UNITED STATES PATENT OFFICE.

DANIEL LUTHER ANTHONY, OF EL PASO, TEXAS.

MEANS FOR INJECTING SEALING LIQUID INTO TIRES.

1,322,507.  Specification of Letters Patent.  Patented Nov. 25, 1919.

Application filed September 26, 1918. Serial No. 255,816.

*To all whom it may concern:*

Be it known that I, DANIEL LUTHER ANTHONY, a citizen of the United States, residing at El Paso, in the county of El Paso and State of Texas, have invented new and useful Improvements in Means for Injecting Sealing Liquid into Tires, of which the following is a specification.

Heretofore considerable trouble and loss of time have been experienced in injecting into the interiors of pneumatic tires of automobiles, bicycles and the like, the sealing liquids, powders, or compounds which are in common use for automatically sealing punctures in said tires. The sealing liquid has been injected by being forced through the valve of the pneumatic tire, but this process required that the valve stem be removed from the stem in order to inject the liquid, and therefore was a very slow one, necessitating about three hours time.

The object of the present invention is to provide an apparatus by which the sealing liquid, powder, or compound can be injected into a pneumatic tube in a very much less time and with less trouble than formerly.

In the accompanying drawing, the figure is a broken sectional view, certain parts of the device shown in side elevation, of my improved mechanism for introducing a sealing liquid into a pneumatic tire.

Referring to the drawing, 1 indicates a cylindrical receptacle which has projecting from its side a loop 2, which can be placed around a lug 3, extending upwardly from the end of a stem 4, extending horizontally from a support 6 having holes therethrough by which it can be attached to any suitable vertically extending surface. On the upper open end of said receptacle is a cap 7 having in a groove 8 in its under side a rubber ring 9, which is of substantially the same diameter as the receptacle, and which rests upon the edge of the receptacle around its upper end. Said cap is firmly held to the receptacle by a screw 11 screwed through the center of a bail 12 the ends of which are pivotally connected to lugs 14 extending outward from diametrically opposite portions of the cylinder. The inner or lower end of said screw is received in a cavity in the upper end of a boss 15 formed centrally on said cap 7. By screwing down said screw 11, the cap 7 may be caused to tightly close the upper end of the receptacle.

Extending upwardly through a hole in the cap 7 is an externally threaded valve casing 16, in which is a spring-actuated air valve 17 similar to the air valve commonly used for inflating pneumatic tires. The lower end of the cylinder tapers internally, as shown at 18, and the opening therein communicates with a passage through a valve casing 19, in which is a rotary valve or pet cock 21. Around the discharge outlet at the lower end of a valve casing is secured the upper end of a flexible tube 22, and the lower end of said tube is secured around a short metallic tube 23, to which is rotatably connected a coupling 24, adapted to be connected to an ordinary tire valve 26.

When it is desired to introduce a sealing liquid into the pneumatic tire through the valve casing 26, if the sealing liquid, as many do, contains small particles of solid matter, as ground cork, the valve core and spring are removed, the pet cock 21 is closed, and the coupling 24 is screwed around the tire valve. Then, a sufficient amount of sealing liquid having been introduced into the cylinder and the cap 7 being firmly secured to the receptacle 1, a tube leading from a source of supply of compressed air is attached to the valve casing 16 extending upwardly through the cap, and compressed air is allowed to flow into the cylinder, raising the pressure therein to that of the source of supply. The pet cock 21 is then opened, and the compressed air forces the liquid through the tapering lower end 18 of the cylinder and through the flexible tube 22 and tire valve 26 into the pneumatic tire. When all of the contents of the cylinder have been discharged into the tire, which can be ascertained by placing the fingers upon the flexible tube, the pet cock 21 is closed the flexible tube is removed from the tire valve, the valve core and spring are replaced in the valve casing, the flexible tube is again attached, and the tire is inflated by opening the pet cock 21.

In case the sealing liquid is a clear liquid, the spring and core need not be removed from the valve casing 26, but the tire can be supplied with sealing liquid and inflated with air in one continuous operation, by first supplying the necessary amount of sealing liquid to the receptacle 1, then closing the receptacle by the cap 7 and placing said receptacle in communication with a source of supply of compressed air, and then opening the pet 21. After the sealing liquid has been supplied to the tire, compressed air then flows thereinto, until the tire has been fully inflated.

The tapering of the inner wall of that part of the cylinder next to the valve casing is an important feature of my invention, for, if this portion of the cylinder were made otherwise than tapering, the compressed air, instead of forcing the sealing liquid through the flexible tube and into the pneumatic tire, would force its way through the sealing liquid, and enter the pneumatic tire, to the exclusion of the sealing liquid.

I have found that, by the proper tapering of the inner surface of this portion of the cylinder, it is impossible for the compressed air to force a passage through the sealing liquid, and said air is compelled to propel the sealing liquid into the pneumatic tire.

I claim:—

1. In combination with a pneumatic tire having externally threaded non-return means for admitting compressed air into said tire, a receptacle, means whereby said receptacle can be supplied with a sealing liquid, a valve casing connected to a discharge passage of said receptacle, a valve therein, a flexible tube one end of which is connected to said valve casing, and a coupling carried on the other end of said tube and internally threaded to screw on said externally threaded means.

2. In combination with a pneumatic tire having threaded non-return means for admitting compressed air into said tire, a receptacle, means whereby said receptacle can be supplied with a sealing liquid, a valve casing connected to a discharge passage of said receptacle, a valve therein, a flexible tube one end of which is connected to said valve casing, and a coupling carried on the other end of said tube and threaded to connect with said non-return means.

DANIEL LUTHER ANTHONY.